United States Patent [19]

Seymour

[11] 3,973,943

[45] Aug. 10, 1976

[54] APPARATUS FOR SUPPORTING SHAPED GLASS SHEETS FOR TEMPERING

[75] Inventor: Samuel L. Seymour, Oakmont, Pa.

[73] Assignee: PPG Industries, Inc., Pittsburgh, Pa.

[22] Filed: Mar. 12, 1975

[21] Appl. No.: 558,050

[52] U.S. Cl. .................................. 65/348; 65/107; 65/114; 65/287; 65/374 RM
[51] Int. Cl.$^2$ .............................................. C03B 27/00
[58] Field of Search ............. 65/107, 287, 288, 289, 65/114, 374 RM, 348

[56] References Cited
UNITED STATES PATENTS 3,250,246    5/1966    Stilley et al. ........................ 65/288 X

*Primary Examiner*—Arthur D. Kellogg
*Attorney, Agent, or Firm*—Dennis G. Millman; Edward I. Mates

[57] ABSTRACT

An outline ring-like tempering mold for supporting shaped glass sheets after they are shaped and during the time they are rapidly quenched, comprising a rigid outline metal rail having an outline slightly inward that of the shaped glass sheet and a bar of non-metallic material having a lower heat transfer coefficient than that of the rigid metal rail and mounted on the rigid metal rail in position to conform to the outline and with an upper edge portion of the bar disposed above the upper edge of the rigid metal rail in position to provide a glass sheet supporting surface in spaced relation above the upper edge of the rigid metal rail. The bar is preferably composed of a material having a heat transfer coefficient less than or, at most, approximating that of the glass sheet being treated, an edgewise compressive strength of at least 10,000 psi (4.8 × $10^4$ Kg/m$^2$), a flexural strength of 10,000 psi (4.8 × $10^4$ Kg/m$^2$) and a minimum shear strength of 10,000 psi (4.8 × $10^4$ Kg/m$^2$). When the bar is composed of a laminated structure, such as fiber glass cloth or asbestos woven paper layers or the like bonded together with a silicone resin binder or a phenolic resin binder, for example, the bar preferably has a bond strength of at least 400 pounds (180 Kg). The bar material effectively insulates a supported glass sheet from direct contact with the rigid metal rail and is sufficiently reinforced by said metal rail to provide adequate support for a shaped glass sheet when the latter is quenched.

10 Claims, 4 Drawing Figures

APPARATUS FOR SUPPORTING SHAPED GLASS SHEETS FOR TEMPERING

BACKGROUND OF THE INVENTION

1. Field of the Invention

In the art of tempering shaped glass sheets, it is common to support a glass sheet on an outline or ring type mold of relatively rigid metal that comprises an outline upper surface shaped to conform to the shape desired for the glass and to sag the glass sheet into conformity with the outline shaping surface by heating the glass laden mold until the glass is sufficiently soft to sag and conform to the shape provided by the shaping surface. When the glass reaches the shaping surface, it is quenched suddenly and rapidly by the application of air blasts against the supported lower surface and against the upper exposed surface of the glass sheet.

If the glass sheet contacts the hot heavy metal rail during this rapid cooling, glass breakage can result from surface vents at the glass-metal contact areas. In the past, glass sheet tempering molds of the outline type have been reduced in thickness along their glass engaging upper edge to reduce the effective heat transferred at the glass engaging surface of the mold or the molds have been provided with ribbons of insulating material such as asbestos or heat resisting materials in the form of a strip of fiber glass to space the supported glass sheet from direct contact with the heavy metal of the outline mold.

U.S. Pat. No. 2,297,315 to Owen discloses such an arrangement. Since it is necessary to replace the ribbon periodically, such a technique is useful only in an operation where a series of molds are used for conveying glass sheets through a bending furnace and then through a quenching station, so that extra molds may be kept in reserve to enable operators to replace worn out ribbon that requires replacement and have an inventory of outline molds ready to replace any production molds whose ribbons are worn out without shutting down the operation to await the replacement of a worn out ribbon or strip on the outline mold.

In apparatus for bending an annealing glass sheets, where the change in temperature is not as sudden as in the temperature cycles common to bending and tempering operations, the difference in thermal response to a change in temperature between the relatively heavy, bending mold having high heat capacity per unit area and the glass sheet having low heat capacity per unit area can be overcome to a certain extent by providing relatively small metal shaping rails that contact the supported glass and that are adjustably secured to relatively rigid stiffening rails. U.S. Pat. No. 3,088,300 to Elliott discloses such an arrangement.

The use of even small metal members or members with serrated edges to contact the glass in spaced relation to the relatively rigid stiffening members is not suitable for use in tempering glass because rapid cooling of the glass is accompanied by a slower rate of cooling by the heated metal portion of the mold in contact therewith and the difference in cooling between the hot glass and the hot metal provides the glass sheet in contact with the metal with a retarded cooling rate compared to the glass not in contact with the metal. This difference in cooling rate between the glass sheet in contact with the metal of the mold shaping surface and the portion of the glass that is completely exposed to the air blasts has resulted in surface tension stresses in the glass. Under certain conditions, the surface tension stresses can be sufficient to cause breakage.

With the advent of the air form method of making shaped tempered glass sheets, wherein the glass sheets are shaped to conform with a mold that holds the glass thereagainst by vacuum and then deposits it on a relatively cool or unheated outline ring-type mold, such as disclosed in U.S. Pat. No. 3,846,106 to Seymour, the outline glass supporting ring that supports the shaped glass sheet during quenching is provided with a reduced thickness and a notched and/or apertured construction in the edge portion that engages the shaped glass to minimize the portion of the relatively cool metal that makes contact with the hotter glass sheet. However, the residual glass to metal contact remaining even with such construction was still sometimes sufficient to cause some breakage. The glass tempering art still needed to develop a technique for further reducing glass breakage resulting from the establishment of too high a thermal gradient from the portion of the supported glass sheet engaged by the shaped sheet supporting outline support structure to a portion of the supported glass sheet adjacent thereto.

The advent of the air form operation which requires the use of a single mold for supporting each glass sheet in succession during the rapid cooling or quenching step makes it impossible to use the winding strand or strip of asbestos or other heat-resisting material such as fiber glass without requiring the entire line to be shut down whenever the strip wears out and requires replacement.

There still remains the need for the glass tempering art to discover a material that is both sufficiently rugged to avoid the need for frequent replacement and is less likely to cause glass sheet breakage during tempering than a metal mold, particularly when glass sheets are shaped and tempered using the air form type of operation.

SUMMARY OF THE INVENTION

According to the present invention, apparatus for supporting a hot shaped glass sheet for cooling comprises an outline support rail of rigid metal having an outline slightly inboard to that of the shaped glass sheet and a bar of non-metallic material having a lower heat transfer coefficient than that of the rigid metal rail mounted against said rigid metal rail in side by side relation to conform to the outline of the rigid metal rail. The bar has an upper edge portion disposed above the upper edge of the rigid metal rail in position to provide a glass sheet engaging surface in spaced relation above the upper edge of the rigid metal rail. Thus, according to the present invention, after the glass sheet has been shaped, particularly by an air form method of the aforesaid Seymour patent, it is supported in direct engagement against a bar of non-metallic material having sufficiently low heat transfer coefficient so as to minimize the effect of the glass contacting member on the rate the glass portion in contact therewith is cooled during rapid quenching.

In a preferred embodiment of the invention, the bar of non-metallic material is in the form of sections that are disposed in end to end relation to one another, each section of which is rigidly secured to the rigid metal rail in surface to surface engagement with said rail to provide a substantially continuous support around the marginal portion of the entire glass sheet in vertically spaced relation above the rigid metal rail. The bar is disposed with its width dimension essentially vertical as is the rigid metal rail so that the rigid metal rail reinforces the non-metallic bar and provides a rigid compound glass sheet support structure comprising a non-metallic bar whose upper edge is shaped to support the shaped glass sheet and a rigid metal rail disposed in side by side relation to said bar to reinforce the latter, yet in spaced relation from the upper edge of said non-metallic bar so as to avoid direct contact between metal and the supported glass sheet. The space between the rigid metal rail and the upper edge of the non-metallic bar is sufficient to reduce the radiation effects of the metal rail sufficiently to avoid glass breakage that frequently occurs when there is direct contact between the glass and the metal mold during quenching and yet sufficiently small so that the bar of non-metallic material has a non-reinforced upper portion that is sufficiently rigid and durable in its own right to be capable of prolonged use under mass production conditions without requiring replacement. A distance of 2 millimeters to 5 millimeters, preferably about 3 millimeters, is a good range of thickness for the upper portion of the non-metallic bar that extends above the upper edge of the rigid metal rail.

The non-metallic bar preferably has a combination of desirable heat transfer properties and structural rigidity. Its heat transfer coefficient is preferably less than that of the rigid metal rail and may even be less than that of the glass sheet undergoing treatment. In addition, it preferably has an edgewise compression strength of at least 10,000 psi ($4.8 \times 10^4$ Kg/m$^2$), a flexural strength of at least 10,000 psi ($4.8 \times 10^4$ Kg/m$^2$), and a minimum shear strength of 10,000 psi ($4.8 \times 10^4$ Kg/m$^2$). When the bar is composed of laminated material, it has a minimum bond strength of 400 pounds (180 Kg).

The present invention will be better understood in the light of a description of the illustrative embodiment of the present invention which follows.

BRIEF DESCRIPTION OF THE DRAWINGS

In the drawings which form part of the description and wherein like reference numbers refer to like structural elements.

DESCRIPTION OF THE PREFERRED EMBODIMENT

Figure 1:
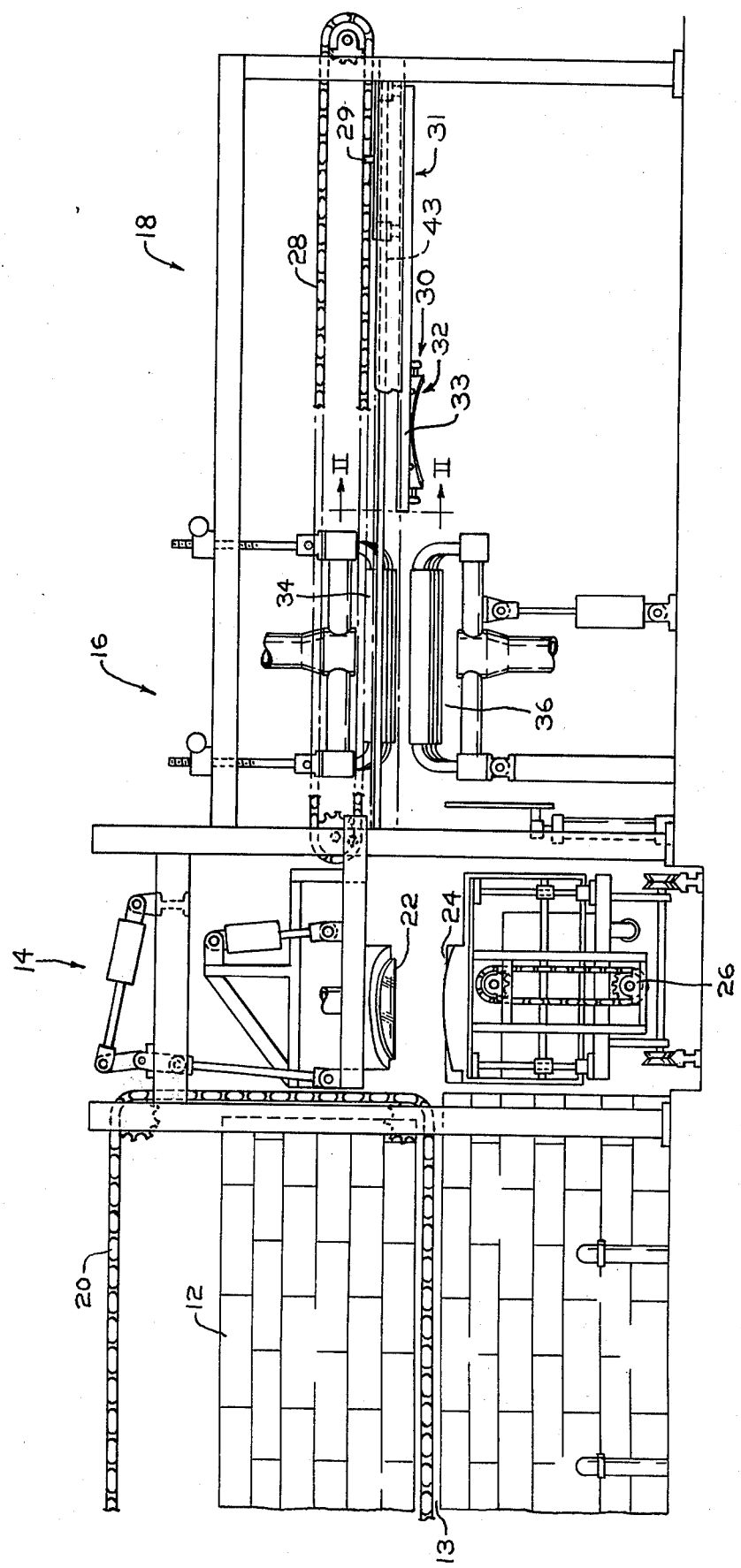
FIG. 1 is a longitudinal elevation of a typical air-form apparatus for shaping and tempering glass sheets for which the present invention has particular utility.
Figure 2:
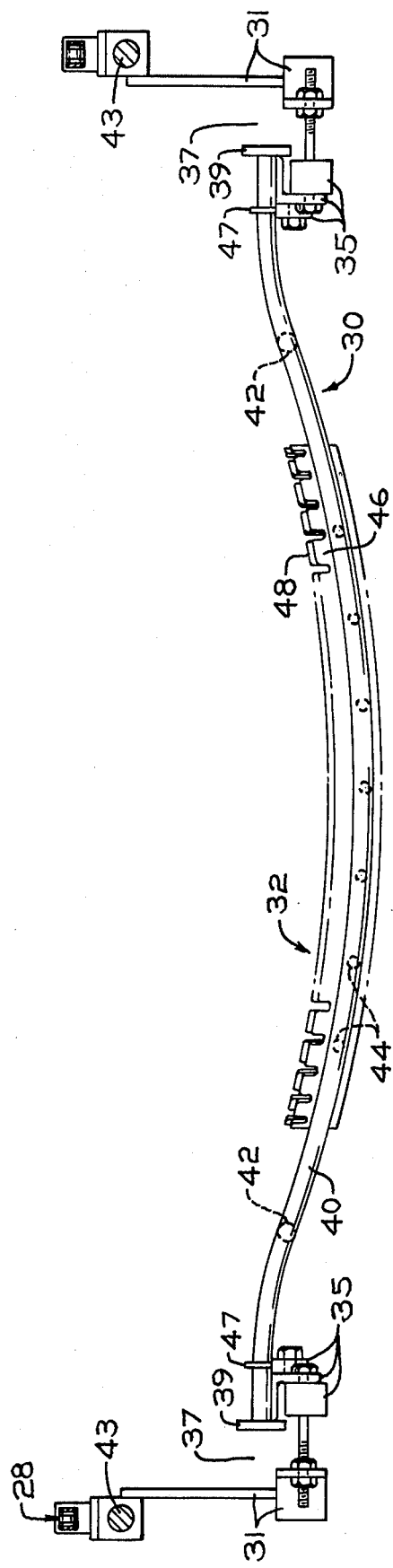
FIG. 2 is an enlarged fragmentary view taken along the lines II—II of FIG. 1.
Figure 3:
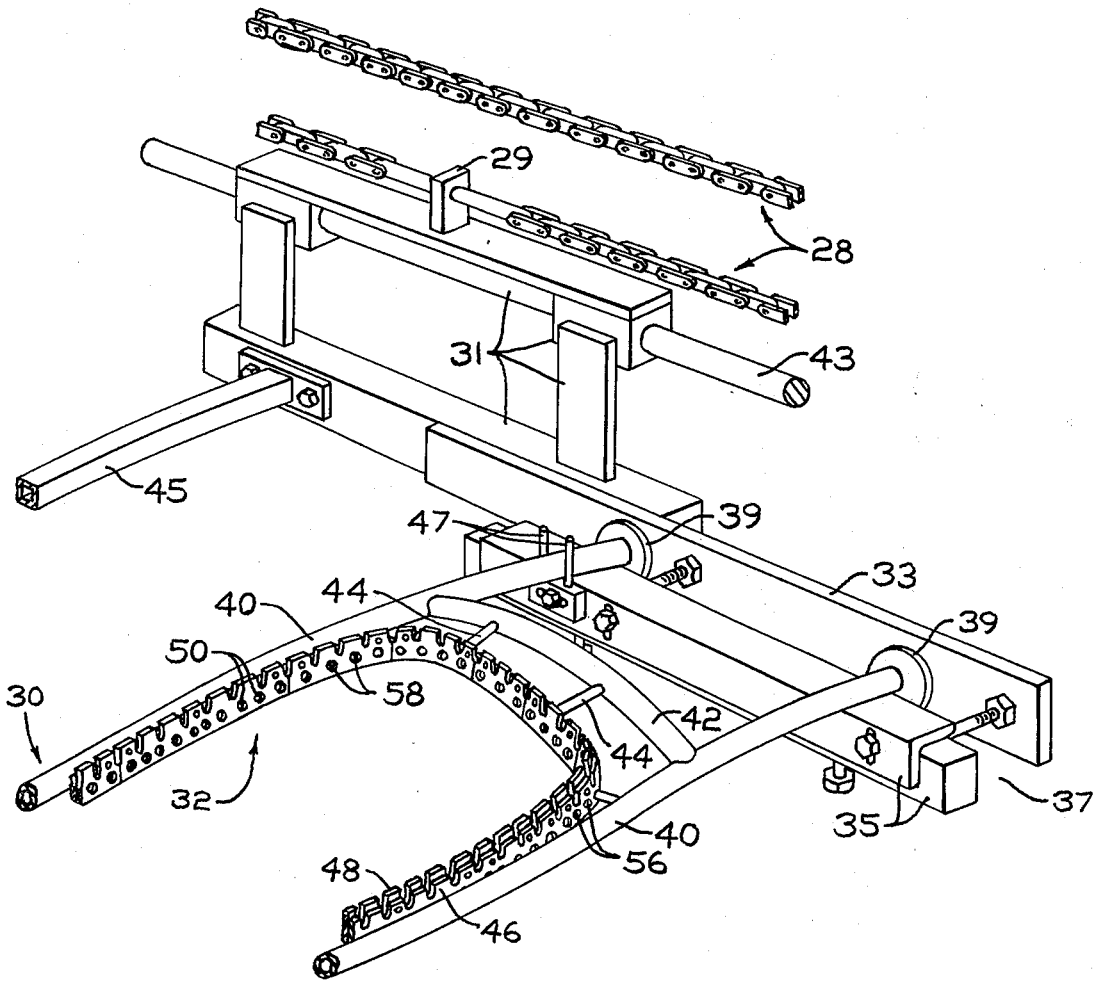
FIG. 3 is a fragmentary perspective view of a portion of apparatus for supporting shaped glass sheets during quenching forming the essential element of the present invention.
Figure 4:
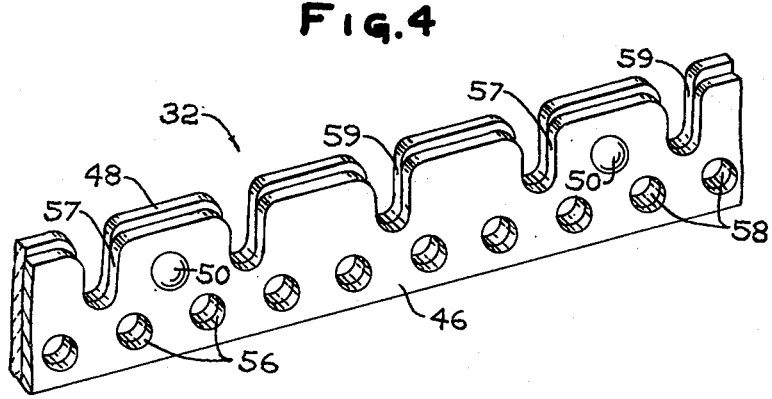
FIG. 4 is an enlargement of a portion of the shaping rail showing the construction thereof.

Referring to the drawings now, FIG. 1 shows a typical air form type of bending and tempering apparatus for which the present invention is especially suited. The apparatus is similar to that of U.S. Pat. No. 3,607,200 or U.S. Pat. No. 3,846,104, the disclosure of which is incorporated herein by reference. Essentially, the air form apparatus comprises a glass loading station (not shown) which is at the entrance or upstream end of a glass sheet heating furnace 12 containing a porous bed of ceramic material 13 having inlet and outlet openings dispersed therethrough in such a manner that hot gas supplied to the surface of the porous bed 13 is applied at a pressure sufficient to float a succession of glass sheets in closely spaced relation to the bed. The upper surface of the bed 13 is flat and the gas is provided at an elevated temperature sufficient to heat the glass. In addition, overhead radiant heaters of gas or electric may be provided to assure that glass sheets are heated to their deformation temperature during their transport through the furnace 12.

Beyond the exit end of the furnace is a glass shaping station 14. A glass cooling station 16 is located beyond the glass shaping station. A glass unloading station 18 is disposed beyond the downstream end of the glass cooling station 16. A first conveyor 20 which comprises a pair of opposing chains interconnected by cross members that engage the edge of different glass sheets conveyed through the furnace to the shaping station is used to transport the glass sheets while they are being floated on the hot gas provided through the porous bed 13 and are irradiated by the radiant heaters disposed throughout the length of the furnace 12 in facing relation to the glass sheets.

Upon leaving the furnace 12, the glass is transferred by a transfer apparatus (not shown) such as the shuttle means 40 of U.S. Pat. No. 3,607,200, and arrives at a position in the glass shaping station 14 intermediate an upper mold 22 having a continuous face provided with foramina connected to a vacuum chamber and a lower ring type mold 24 whose outline conforms to the shape of the lower surface of the upper mold 22. Lifting and lowering means 26 is provided to raise and lower the lower ring mold 24 when a glass sheet arrives in alignment between the upper mold 22 and the lower ring mold 24.

A second conveyor 28 having an upstream end near the glass shaping station 14 and a downstream end at the unloading station 18 is also provided with a pair of spaced chains similar to the chains of the first conveyor 20. The spaced chains are moved in unison to actuate movement of a pair of lugs 29 (one attached to the lower run of each chain of the second conveyor 28). Each lug 29 is connected to a carriage 31. The latter is provided with an upstream portion 33 in cantilever relation thereto. Each upstream portion 33 comprises inner structural members 35 held in spaced relation to the main portion of the upstream portion 33 to form a longitudinal groove 37 that receives a pair of washers 39. The latter are provided at the longitudinal ends of a pair of elongated curved transverse members 40, one located upstream and the other downstream. The members 40 are interconnected near their ends by cross members 42 to form an outrigger structure 30 that is in spaced relation surrounding a shaped glass sheet supporting apparatus 32 of outline, elongated, ring-like structure whose upper edge conforms to the glass shape. Spaced connectors 44 interconnect apparatus 32 to structure 30.

Each carriage 31 is apertured to receive a slide rail 43. A connector rod 45 interconnects the downstream ends of carriages 31. The glass sheet supporting apparatus 32 is supported by the outrigger structure 30 between the upstream portions 33 of the carriages 31. Locking means in the form of a U-shaped receptacle 47 is provided in transverse alignment from carriage to carriage to receive the opposite ends of the downstream elongated curved transverse member 40.

The second conveyor 28 is actuated to move the lugs 29 and their attached carriages 31 so that the shaped glass sheet supporting apparatus 32 occupies an unloading position shown in FIG. 1 or a position in alignment between the upper mold 22 and the lower ring mold 24 at the glass shaping station 14 or an intermediate position at the glass cooling station wherein the sheet supporting apparatus 32 is reciprocated relative to and between an upper set of nozzles 34 and a lower set of nozzles 36 respectively, at the glass cooling station 16.

It is understood that the operation of the patented apparatus involves heating a succession of glass sheets conveyed by the first conveyor 20 through the glass sheet heating furnace 12 while floated over the porous ceramic bed 13 until the glass arrives at the position intermediate the upper mold 22 and the lower ring type mold 24. The lifting and lowering means 26 raises the lower ring type mold 24 to bring the glass into pressurized engagement against the upper mold 22. At this time, a vacuum is applied through the upper mold 22 to hold the shaped glass sheet against the upper mold 22 and the lower ring type mold 24 is retracted to a position indicated in FIG. 1 to await the arrival of the next glass sheet. In the meantime, the relatively cool shaped glass sheet supporting apparatus 32 is moved upstream into a position immediately below the upper mold 22, the vacuum to the upper mold 22 is stopped and the shaped glass sheet is permitted to drop onto the upper shaped surface of the shaped glass sheet supporting apparatus 32.

The second conveyor 28 moves the apparatus 32 into a position intermediate the upper set of nozzles 34 and the lower set of nozzles 36 at the glass cooling station 16. The glass is rapidly cooled at the glass cooling station by applying air under pressure through the nozzles 34 and 36 while the shaped glass sheet supporting apparatus 32 is moved back and forth in a reciprocating movement within the area encompassed by the opposing nozzles 34 and 36.

When the glass is sufficiently chilled, the second conveyor 28 moves the shaped glass sheet supporting apparatus 32 to the unloading station 18 where the glass sheet is removed from the apparatus 32. With the shaped cooled glass sheet removed therefrom, the sheet supporting apparatus 32 again moves upstream toward the glass shaping station 14 to receive the next glass sheet that has been shaped by the same series of operating steps described previously.

It will be appreciated from this that the material from which the glass sheet supporting apparatus is fabricated must be sufficiently strong to withstand the dropping of a glass sheet through a short vertical distance from contact with the upper mold 22 onto the upper surface of the sheet supporting apparatus 32. It also must be appreciated that the glass contacting element of the sheet supporting apparatus must be one that is capable of undergoing a rapid change of temperature from the temperature of the heat-softened glass sheet that is shaped at the glass shaping station and the lower temperature to which the sheet supporting apparatus 32 is exposed at the cooling station 16. Another important characteristic of the glass engaging means of the glass sheet supporting apparatus 32 is that it must have a low thermal expansion and a low thermal conductivity and must be capable of being formed so that it can assume the shape of a portion of a glass sheet to be supported thereby.

A suitable glass contacting material useful for the glass engaging means according to the present invention is a material commonly used for electrical insulator material that is sold as Synthane G-7 electric board by the Synthane Taylor Company of Valley Forge, Pennsylvania. This material is composed of a series of fiber glass layers bonded together with an epoxy resin believed to be a highly cured methyl phenyl silicone. The glass engaging material and its relation to the rigid metal rail 32 according to the teaching of this invention will be described in detail.

According to the present invention, the material that receives the shaped glass sheet while hot and remains in contacting support with the glass sheet during its cooling preferably should have the minimum physical properties enumerated in the following table. The properties of Synthane G-7 electrical board are listed by way of comparison.

| PHYSICAL PROPERTY | PREFERRED REQUIREMENTS | SYNTHANE G-7 |
| --- | --- | --- |
| Tensile strength (edgewise) | 10,000 psi (4.8 × 10$^4$ Kg/m$^2$) minimum | 14,000 psi (5.4 × 10$^4$ Kg/m$^2$) |
| Flexural strength (lengthwise) | 10,000 psi (4.8 × 10$^4$ Kg/m$^2$) minimum | 20,000 psi (9.7 × 10$^4$ Kg/m$^2$) |
| Shear strength | 10,000 psi (4.8 × 10$^4$ Kg/m$^2$) minimum | 17,000 psi (8.3 × 10$^4$ Kg/m$^2$) |
| Bond strength | 400 pounds (180 Kg) minimum | 650 pounds (300Kg) |
| Thermal Conductivity | Less than glass | 7 × 10$^{-4}$ cal/sec/cm$^2$/°C/cm |

The shaped glass sheet supporting apparatus 32 comprises a continuous outline metal rail 46 that extends in the form of a closed ring-like structure to provide rigidity to the glass sheet supporting apparatus and a series of non-metallic bars or bar portions 48 formed from cutting a board of non-metallic material such as a board of low-expansion material having a low heat conductivity and approximately 3 millimeters thick into short lengths, each having a desired shape conforming to the shape of a different portion of the heavy metal rail 46 except that the short lengths of bars 48 are wider than the width of the heavy metal rail 46. Each bar 48 is secured to the inner surface of the rigid metal rail 46 by nut and bolt means 50 spaced throughout the peripheral length of the reinforcing metal rail 46 and extending through aligned bolt-receiving openings in the rigid metal rail 46 and a bar portion 48. The bottom edge of the bar portions 48 are aligned with the bottom edge of the rigid metal rail 46, although this is not absolutely necessary except that in such an arrangement the full height of the metal rail is provided in side by side relation to the bar portions 48 to reinforce the structural rigidity of the bar portions of non-metallic material.

The upper edge of each bar portion 48 of non-metallic material is disposed above the upper edge surface of the reinforcing rigid metal rail 46 so that when glass is deposited on the shaped glass sheet supporting apparatus 32, it makes contact only with the non-metallic glass engaging means provided by the bar portions 48 that are reinforced by the rigid metal rail in spaced relation below the line of glass sheet contact. The distance between the glass supporting surface of the bar portions above the upper edge of the rigid reinforcing metal rail is preferably sufficient to provide a path of heat conduction through said non-metallic bar portions of sufficient length to have minor detrimental effects only on the cooling of the glass contacting portion, yet not so long as to endanger the structural strength of the non-metallic bar portions.

In a typical apparatus, the reinforcing metal rail 46 is provided with apertures 56 and its upper edge has notches 57 to provide paths of escape for air blasts that are applied against the supported glass sheet in the glass cooling station 16. The non-metallic bar portions 48 are similarly constructed with apertures 58 thereof, aligned with the apertures 56 in the rigid metal rail 46 and their upper edges having notches 59 deeper than the notches 57 of the rigid metal rail 46 and aligned with said notches 57. The glass engaging edges of the non-metallic bar portions 48 are approximately 3 millimeters above the upper edge of the reinforcing metal ring 46 so that the glass sheet is supported in spaced relation to any metal and only contacts the non-metallic bar portions 48 of the outline supporting apparatus 32.

Another material suitable for fabricating into the bar portions is a material sold as Synthane Grade AA-HT, which comprises layers of asbestos woven paper bonded together with a phenolic resin. Another suitable material contains a continuous filament glass fabric body in a binder of a phenolic resin which is available as Synthane Grade G3-8T. Where the outline ring conforming to the outline of the glass sheet is very sharply curved, it is preferred that the non-metallic bar portions be made of relatively short lengths, such as 75 millimeters, whereas the length of the non-metallic bar portions 48 may be longer in those regions of the outline supporting apparatus 32 where the curvature is not so severe.

In order to determine whether the present invention has utility, glass sheets having a nominal thickness of 5/32 inch (4 millimeters) were bent and tempered on air form apparatus using a rigid rail that was serrated and apertured and had its glass contacting edge 1/16 inch (1.6 millimeters) wide for the apparatus supporting the shaped glass sheet in the air form apparatus using an unmodified all metal outline supporting structure. The periphery of the shaped glass was scribed with a tungsten carbide tip with marks 50 to 75 millimeters long about 50 millimeters apart and 0.02 millimeters to 0.025 millimeters deep extending normal to the edge. After scribing about two-thirds around the periphery, the sample broke about 6 millimeters in from the edge at a metal contacting area.

In contrast, a glass sheet having a nominal thickness of ⅛ inch (3 millimeters), which is considered easier to fracture, passed the scribing test even with the scribe marks 0.05 millimeters deep. The latter glass sheet that passed the test was quenched while supported on a composite shaped glass sheet supporting apparatus comprising a rigid apertured serrated metal rail 3 millimeters thick and about 16 millimeters high reinforcing a series of bar portions of Synthane G-7 — 3 millimeters thick and 19 millimeters high disposed with their serrated upper edges 3 millimeters above the upper edge of the metal rail.

Further tests under production conditions producing a commercial part using air form apparatus provided with a shaped glass sheet supporting apparatus composed exclusively of an apertured, serrated rigid metal rail that contacted the glass sheet during quenching as in the prior art compared to air form apparatus provided with the composite metal-reinforced non-metallic glass engaging bar portions as in the embodiment of the present invention described herein showed a rate of breakage frequency of 15 to 1, with the apparatus modified according to the present invention providing less incidence of breakage.

The foregoing description represents a preferred embodiment of the present invention. It is understood that various changes may be made without departing from the gist of the invention as defined in the claimed subject matter that follows. Suffice it to say that the gist of the present invention comprises a relatively rigid reinforcing member that is formed of metal so as to be able to provide sufficient reinforcement of the non-metallic bar portions that engage the glass sheet during the cooling thereof following its shaping by the air form apparatus. The non-metallic bar extends a short distance above the relatively heavy, high thermal capacity, metal rail which reinforces the non-metallic bar throughout its length but not throughout its entire width.

The reinforcing metal rail 46 and the non-metallic bar 48 are disposed in side by side relationship so that only a small portion of the width of the non-metallic bar that engages the glass sheet is not reinforced by the relatively rigid metal rail and the metal rail 46 is disposed sufficiently below the supported glass sheet as to maintain the glass sufficiently spaced from the metal throughout the cooling operation so that the relatively slow cooling of the reinforcing metal of the shaped glass sheet supporting apparatus does not unduly influence the rate of cooling of the glass sheet in alignment therewith.

I claim:

1. Apparatus for supporting a hot shaped glass sheet for cooling comprising an outline support rail of rigid metal having an outline slightly inboard of that of said shaped glass sheet and a bar of non-metallic, rigid, fiber-reinforced, resin material having a lower heat transfer coefficient than that of said rigid metal rail mounted on said rigid metal rail in position to conform to said outline, said bar having an upper edge portion disposed above the upper edge of said rigid metal rail in position to provide a glass sheet engaging surface in spaced relation above said upper edge of said rigid metal rail and having sufficient of its dimension below said upper edge portion in side by side relation to said rigid metal rail to have its structural rigidity reinforced by said rail.

2. Apparatus as in claim 1, wherein said bar of non-metallic material is composed of a series of short sections disposed in end to end relation, each of said sections having a portion below its upper edge portion joined to a different portion of said rigid metal rail to be reinforced thereby.

3. Apparatus as in claim 1, wherein said bar of non-metallic material is attached to said rigid metal rail in abutting relation therewith with its bottom edge aligned with the bottom edge of said rigid metal rail and its upper edge extending above the upper edge of said rigid metal rail.

4. Apparatus as in claim 1, wherein both said rigid metal rail and said bar of non-metallic material are provided with aligned apertured portions along their upper edges.

5. Apparatus as in claim 4, wherein both said rigid metal rail and said bar are provided with aligned notches along their upper edges.

6. Apparatus as in claim 1, wherein said bar has its upper glass contacting edge disposed between 2 millimeters and 5 millimeters above the upper edge of said rigid metal rail.

7. Apparatus as in claim 6, wherein said bar has its upper glass contacting edge disposed vertically approximately 3 millimeters above the upper edge of said rigid metal rail.

8. Apparatus as in claim 1, wherein said bar of non-metallic material has a maximum heat transfer coefficient no greater than that of the glass supported thereby.

9. Apparatus as in claim 8, wherein said bar of non-metallic material has a compressive strength of at least 10,000 psi ($4.8 \times 10^4$ Kg/m$^2$) edgewise, a flexural strength of at least 10,000 psi ($4.8 \times 10^4$ Kg/m$^2$) lengthwise, and a minimum shear strength of 10,000 psi ($4.8 \times 10^4$ Kg/m$^2$).

10. Apparatus as in claim 9, wherein said bar is of laminated material having a bond strength of at least 400 pounds (180 Kg.) between adjacent lamina.

* * * * *